US010380927B1

(12) United States Patent
Parcels

(10) Patent No.: US 10,380,927 B1
(45) Date of Patent: Aug. 13, 2019

(54) HYBRID SCANNING DISPLAY AND ASSOCIATED MECHANISMS

(71) Applicant: Bradley James Parcels, Calgary (CA)

(72) Inventor: Bradley James Parcels, Calgary (CA)

( * ) Notice: Subject to any disclaimer, the term of this patent is extended or adjusted under 35 U.S.C. 154(b) by 0 days.

(21) Appl. No.: 15/260,316

(22) Filed: Sep. 8, 2016

Related U.S. Application Data

(60) Provisional application No. 62/215,698, filed on Sep. 8, 2015.

(51) Int. Cl.
| | | |
|---|---|---|
| *G02B 26/10* | (2006.01) | |
| *G02B 26/08* | (2006.01) | |
| *G02B 27/01* | (2006.01) | |
| *G02B 27/00* | (2006.01) | |
| *G09G 3/02* | (2006.01) | |
| *G09G 3/00* | (2006.01) | |
| *G02B 27/28* | (2006.01) | |

(52) U.S. Cl.
CPC ............. *G09G 3/02* (2013.01); *G02B 26/101* (2013.01); *G02B 27/0093* (2013.01); *G02B 27/0172* (2013.01); *G02B 27/288* (2013.01); *G09G 3/002* (2013.01); *G02B 2027/011* (2013.01); *G02B 2027/0127* (2013.01); *G02B 2027/0147* (2013.01); *G09G 2320/028* (2013.01); *G09G 2320/08* (2013.01); *G09G 2340/0407* (2013.01)

(58) Field of Classification Search
CPC .... G02B 27/017–0172; G02B 26/0875; G02B 26/0883; G02B 26/101; G09G 3/02; G09G 3/002
See application file for complete search history.

(56) References Cited

U.S. PATENT DOCUMENTS 5,764,280 A * 6/1998 Bloom ................... B60K 35/00
345/8
2016/0131761 A1 * 5/2016 Yates ......................... G01S 1/70
356/3.11

* cited by examiner

*Primary Examiner* — Xuemei Zheng

(57) ABSTRACT

A display device that significantly improves upon existing scanned display technology (Bloom et al. U.S. Pat. No. 5,764,280), and allows for entirely new display form factors. Just a few of the embodiments may provide: low cost displays that replace computer monitors and televisions, folding displays on mobile devices, entirely new forms such as pedestal/conference room displays that allow a user to walk around virtual objects, or even provide fully immersive simulation environments with visual fidelity never before possible. Furthermore, one or more embodiments eliminate the shortcomings, discovered by the present inventor, in displays of the type described by U.S. Pat. No. 5,764,280.

22 Claims, 8 Drawing Sheets

HYBRID SCANNING DISPLAY AND ASSOCIATED MECHANISMS

CROSS-REFERENCE TO RELATED APPLICATIONS

Figure 1A:
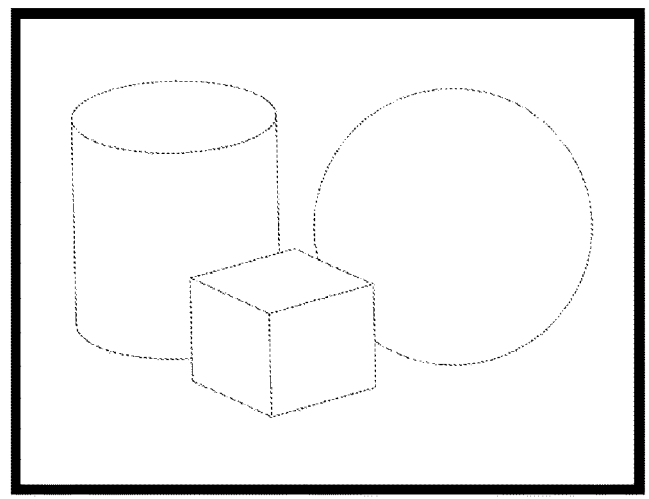

This application claims the benefit of provisional patent application Ser. No. 62/215,698, filed 2015 Sep. 8 by the present inventor, which is incorporated by reference.

BACKGROUND

Prior Art

The following is a tabulation of some prior art that presently appears relevant:

U.S. Patents

| Pat. No. | Kind Code | Issue Date | Patentee |
|---|---|---|---|
| 5,764,280 | | Jun. 9, 1998 | Bloom |
| 4,934,773 | | Jun. 19, 1990 | Becker |

U.S. patent application Publications

| Publication Nr. | Kind Code | Publ. Date | Applicant |
|---|---|---|---|
| US20160131761A1 | | May 12, 2016 | Yates |

NONPATENT LITERATURE DOCUMENTS

Escuti, M. J., *Optica* journal Vol. 2 No. 11, November 2015, "Fabrication of ideal geometric-phase holograms with arbitrary wavefronts Escuti, M. J., *IEEE Photonics Technology Letters* Vol. 22 No. 4, February 2015, "High-Throughput Continuous Beam Steering Using Rotating Polarization Gratings"

BACKGROUND ART

Despite increasing in ubiquity, current display technologies remain quite limited by many factors: size, resolution, viewing angle, and of course—cost. Traditional televisions and computer monitors are rapidly growing in both size and resolution, while simultaneously shrinking in depth and weight—but despite the impressive rate of advancement—users remain confronted by competing priorities: a larger display with more resolution is almost always desirable—but the physical space occupied by such a display can often be limiting, as can the cost—both of which increase proportionately with the desirable traits. Head Mounted Displays (HMDs) have long been heralded as the panacea for these, and many other display shortcomings—however—HMDs have failed to deliver on this promise to date. Available HMDs are plagued by low resolution, poor image quality, severe user discomfort, and very high cost. Recent work from Oculus, Valve, Google, and Sony (among others) has come a long way towards improving on many of these individual shortcomings; but unfortunately, even the best HMDs today do not solve the full group of issues mentioned. As a result, HMDs are not currently practical for anything but niche and novelty use.

The fact that no commercially available HMD is comfortable and inconspicuous enough for use in everyday life is high on the list of remaining problems. Google "Glass" was getting closer in this regard—but they have only proven the overall point—the (now discontinued) product offered a resolution of only 640×360 at a price that was difficult to justify, when many mainstream smartphones now include displays with 2560×1600 resolutions.

The Oculus "Rift" went the other way—their displays are improving in resolution (1080×1200 per eye), and pricing is significantly lower than the Google "Glass" was—however, this device is bulky and obtrusive; condemning it's use to gaming and niche applications.

In fairness to the admirable work done recently, it must be said that these companies are fighting the same fundamental problem that has existed for decades: to create a traditional HMD with existing technology, it has been necessary to choose a specific application, and make compromises (size, weight, resolution, cost etc.) as that particular application demands. Decades of failed attempts, by some of the best funded companies in the world, attest to the difficulty in creating a headset that can satisfy all (or even most) of the desirable features for a truly useful HMD.

A much older technology offers a hint of a possible solution to these problems: with U.S. Pat. No. 4,934,773 (originally filed in 1987), Becker provides an architecture for HMDs where a full two-dimensional image source was no longer required. It was a good start, but still required bulky optics and specialized micro-arrays of LEDs. On top of this, the resolution achieved at the time was a tiny fraction of what is now expected.

Building on these ideas, in U.S. Pat. No. 5,764,280 (filed ten years later—in 1997), Bloom et al. appear to have made another leap forward by bringing the array of light sources outside of the headset; but unfortunately, this meant giving up the possibility of an immersive system. Furthermore—I have found serious flaw with the display of said patent: the user must keep their head perfectly perpendicular to the array, or the image is distorted into a parallelogram—devolving completely to a line when at 90 degrees. Bloom et al. failed to identify or address this issue, and as a result, their architecture remains entirely unsuitable for many important applications.

SUMMARY OF THE EMBODIMENTS

A display device that significantly improves upon existing scanned display technology (Bloom et al. U.S. Pat. No. 5,764,280), and allows for entirely new display form factors. Just a few of the embodiments may provide: low cost displays that replace computer monitors and televisions, folding displays on mobile devices, entirely new forms such as pedestal/conference room displays that allow a user to walk around virtual objects, or even provide fully immersive simulation environments with visual fidelity never before possible. Furthermore, one or more embodiments eliminate the shortcomings, discovered by the present inventor, in displays of the type described by U.S. Pat. No. 5,764,280.

A display system for displaying a two-dimensional image comprising: a display means including a plurality of light sources arranged to form an array of display elements with a predetermined spatial distribution. Said display means including means for modulating each of said light sources for representing elements of the two-dimensional image. At least one scanning means worn or carried by a user for viewing said array, said scanning means in electronic communication with said display means, and including a scanning device and driving means for driving said scanning device. Said modulating means and said scanning means cooperative via said electronic communication for synchronizing said modulating means and said scanner driving means such that the user views said one-dimensional array of display elements, via said scanning means, as the two-dimensional image. At least one tracking means to measure at least one of the relative angles of displacement of said scanning means with respect to said display means. Distance between said scanning means and said display means being variable while still permitting the user to view the two-dimensional image through said scanning means.

A display system for displaying a two-dimensional image comprising: a display means including a plurality of light sources arranged to form a two-dimensional array of display elements, said display means including means for modulating each of said light sources for representing elements of the two-dimensional image; at least one scanning means worn or carried by a user for viewing said two-dimensional array, said scanning means in electronic communication with said display means, and including a scanning device and driving means for driving said scanning device; said modulating means and said scanning means cooperative via said electronic communication for synchronizing said modulating means and said scanner driving means such that the user views said one-dimensional array of display elements, via said scanning means, as the two-dimensional image; and distance between said scanning means and said display means being variable while still permitting the user to view the two-dimensional image through said scanning means.

A display system for displaying a two-dimensional image comprising: a display means including a plurality of light sources arranged to form a plurality of physically separate display element arrays, said display means including means for modulating each of said light sources for representing elements of the two-dimensional image; at least one scanning means worn or carried by a user for viewing said display element arrays, said scanning means in electronic communication with said display means, and including a scanning device and driving means for driving said scanning device; said modulating means and said scanning means cooperative via said electronic communication for synchronizing said modulating means and said scanner driving means such that the user views said one-dimensional array of display elements, via said scanning means, as the two-dimensional image; and distance between said scanning means and said display means being variable while still permitting the user to view the two-dimensional image through said scanning means.

DRAWINGS—FIGURES

In the drawings, closely related figures have the same number but different alphabetic suffixes.

Figure 1B:
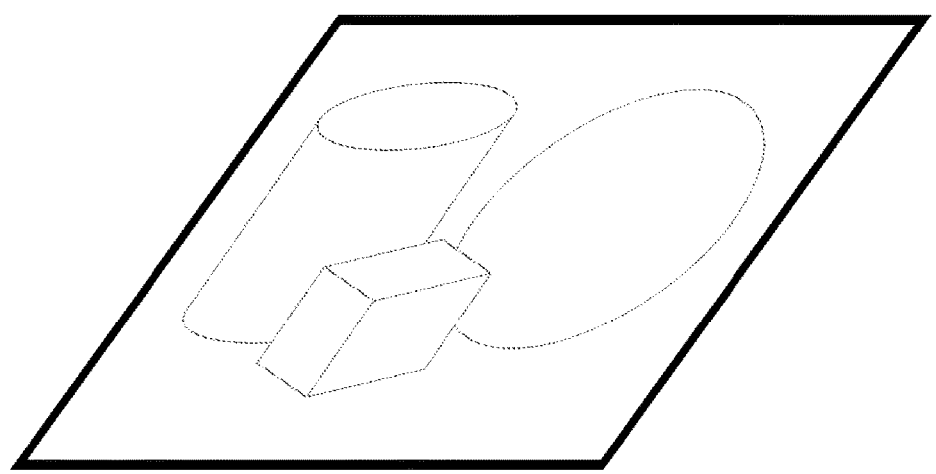
Figure 2A:
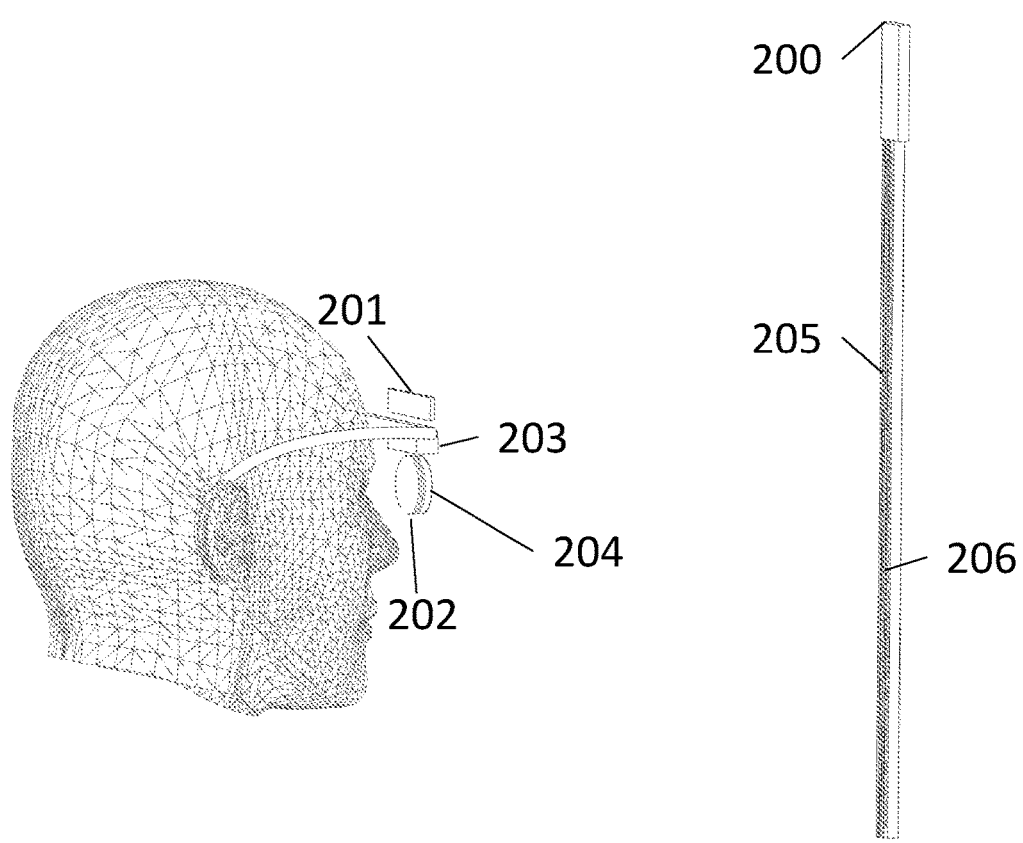
Figure 2B:
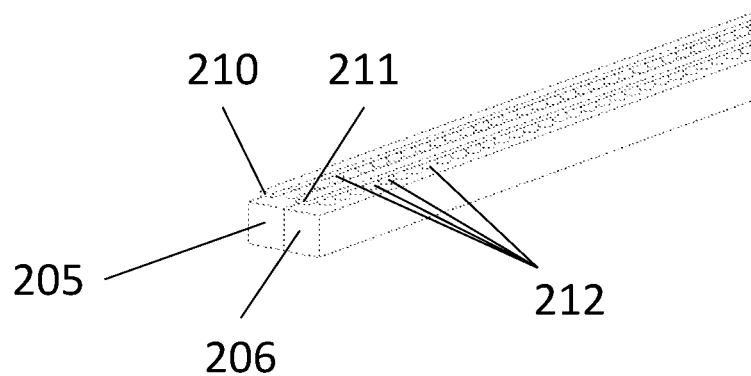
Figure 2C:
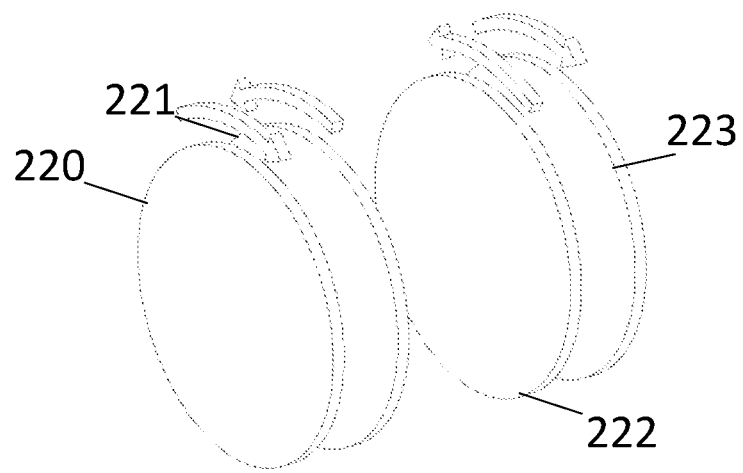
Figure 2D:
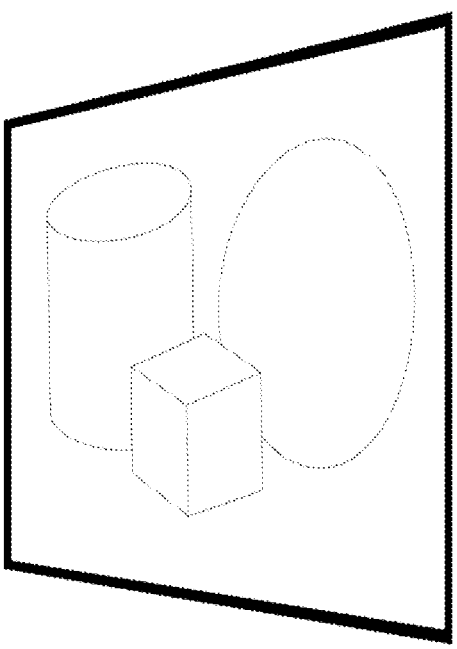
Figure 2E:
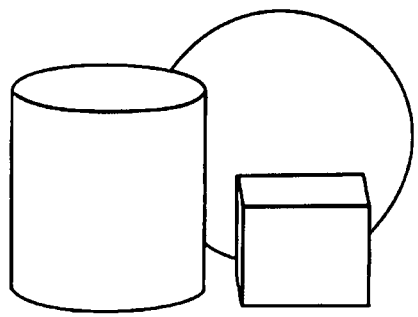
Figure 2F:
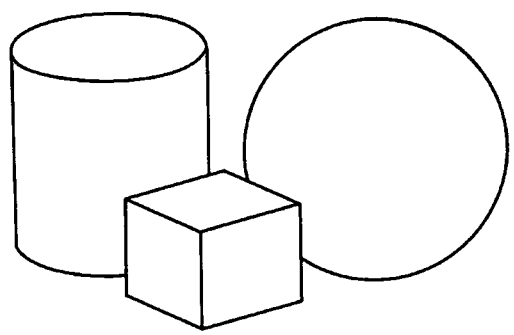
Figure 3:
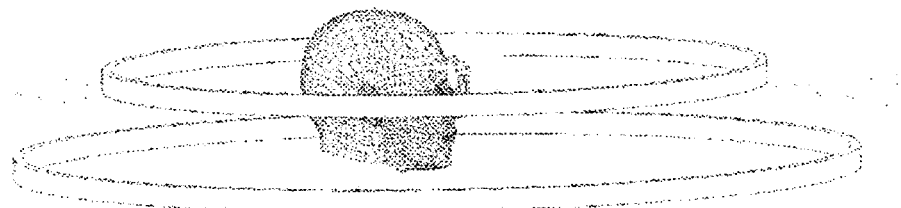
Figure 4:
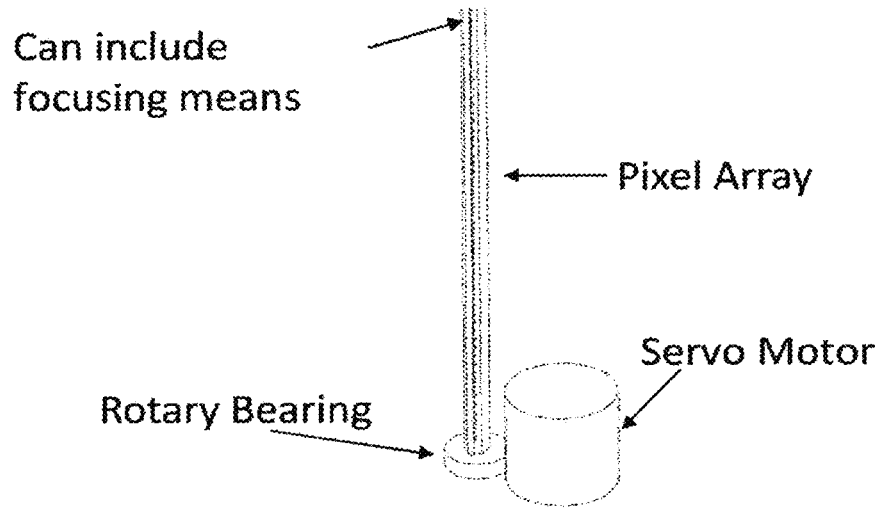
Figure 5:
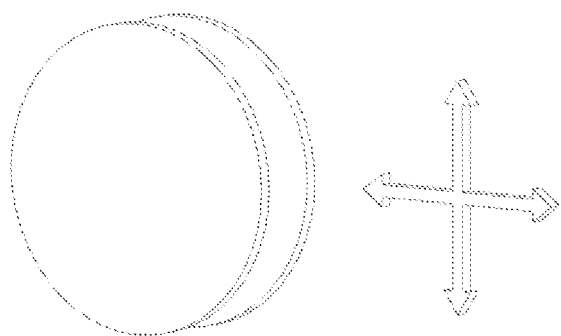
Figure 6:
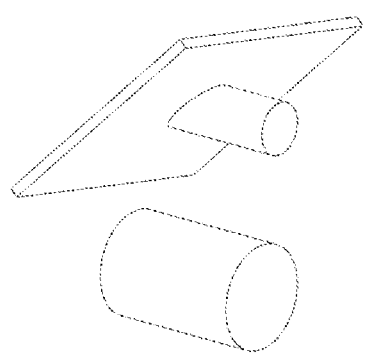

FIG. 1A—Properly displayed image
FIG. 1B—Image suffering distortion from tilt
FIG. 2A—First embodiment
FIG. 2B—Close-up of dual array
FIG. 2C—Dual Risley scanner
FIG. 2D—Display from an angle showing perspective effect
FIG. 2E—View from one angle
FIG. 2F—View from a second angle
FIG. 3—Second embodiment
FIG. 4—Steerable array
FIG. 5—2D offset lens or holographic lens
FIG. 6—1D scanner using servo to act as 2D scanner
FIG. 7—2D scanner made up of two 1D scanners

DETAILED DESCRIPTION

As much of the operation and physical structure of several embodiments are shared with the work of Bloom et al., we incorporate by reference their U.S. Pat. No. 5,764,280 (issued Jun. 9, 1998) in it's entirety, in an effort to maintain a clear and compact disclosure.

We will first address a serious flaw that I have found in displays built according to U.S. Pat. No. 5,764,280; which is that if a user's head is not perfectly perpendicular to the light source array of such a display, the perceived two-dimensional image becomes severely distorted—progressing down to a single line of light when the vertical axis of the user's head is parallel to the axis of the linear light source array. This effect is illustrated by observing FIG. 1A, which displays the correct image as seen by a user whose head is perpendicular to the array; and then observing FIG. 1B, which shows the distorted image seen by a user who tilts their head. This flaw arises in both horizontal and vertical array styles, and was not identified or addressed in said patent. Such image distortion renders a display entirely unsuitable for many applications, including some that were particularly identified for the display (such as home theatre use). A home theatre system that cannot allow a user to tilt their head when laying on a couch is of little practical use. It also prevents such a display from being used in more advanced applications, such as diagnostic imaging assisted medical procedures.

As will be seen below, multiple embodiments of the present patent will eliminate this issue entirely.

Description—FIGS. 2A, 2B, 2C—First Embodiment

Looking to FIG. 2A, we observe a first embodiment, and note some of the major physical changes from the prior art. First, mounting tracking system transmitter (200) to the display unit housing. Next, adding multiple tracking system sensors, which are schematically illustrated as tracking system receiver (201), together replace the rangefinder means of the prior art.

Further, we note that the scanning mirror mechanism and driver is replaced with a Risley scanning system (202), driven by an associated Risley Driver (203).

Mounted directly in front of the Risley scanning system (202), we have a right-handed circularly polarized (RHCP) optical filter (204). The far eye not visible in the diagram, with it's corresponding scanning mechanism, would have a left-handed circularly polarized (LHCP) optical filter.

Finally, we note that the light element array is actually duplicated into left array (205) and right array (206). This duplicate array is shown more clearly by FIG. 2B, where a fragmented perspective view of the dual arrays is seen. In FIG. 2B, it is also clear that we have added a corresponding LHCP optical filter (210) to the left array (205), and a RHCP optical filter (211) to the right array (206). Also visible, are the individual light emitting elements (212), which are, for this embodiment, full color (which means red, green, and blue emitters in the same package) light emitting diodes (LEDs).

Moving now to FIG. 2C, we see an expanded view of the Risley scanning system (202). While two element Risley scanning systems based on either prisms or gratings are known to those in the art, we see here that our Risley scanning system employs a first pair of polarization gratings (220 and 221), as well as a second pair of polarization gratings (222 and 223).

Operation—FIGS. 2A, 2B, 2C, 2D, 2E, and 2F—First Embodiment

While operating in a similar fashion to the display of U.S. Pat. No. 5,764,280 (and the reader is referred to that patent to understand the basic principles); this embodiment differentiates itself in several ways.

Firstly, an integrated tracking system transmitter (200) emits two scanned beams of invisible laser light, which are then received by tracking system receiver (201), which makes note of the time of arrival with respect to the frame synchronization. By synchronizing said scanned beams with the frame rate of the display, the headset is able to triangulate its relative position and orientation with respect to the array. While any modern tracking system will suffice for this task, and many are known in the art; we speak specifically of the tracking system described in Yates patent application US20160131761A1 (published May 12, 2016, and incorporated by reference), purely as a means of condensing this disclosure, and providing clarity to the rest of the system.

Secondly, the incorporation of a Risley scanning system (202), allows the scanning trajectory to be altered based on the relative orientation given by (200). By scanning across a trajectory that is truly perpendicular to the arrays (205 and 206), we are able to achieve the behavior described in the patent of Bloom et al.—that is, the display behaves as though it were a traditional two-dimensional display, and the effect of perspective is seen. This effect is displayed in FIG. 2D. Further, by incorporating two risley pairs, we are able to eliminate the "offset" introduced near the null point; in addition to being able to vary the amplitude of the linear scan, simply by adjusting the phase between the two risley pairs.

Interestingly, if we choose not to scan across the true perpendicular trajectory, but instead scan across a trajectory that simply counters the tilting of a users head, we are left with a display that acts as though the display is always facing directly at the user (as in FIG. 1A). This enables such a display to be observed from multiple angles, and if the tracking data from (201) is forwarded to a computer supplying the video data, it is possible to have a "walk around display" where the imagery emulates a true 3D scene that can be observed from multiple angles. This effect is depicted in FIGS. 2E and 2F—a scene from multiple angles, but always appearing as though the display was directly facing the user.

Additionally, by incorporating two separate arrays, and placing circular polarizing filters in front of both the arrays and the scanners, we are able to create two separate image channels that may operate simultaneously. This may be used to provide stereoscopic imagery, or may be used to provide different video signals to different users.

Other Embodiments—FIG. 3

In this embodiment, we see that a user is surrounded by ring-shaped display element arrays. In so doing, the user is presented with a full 360 degree immersive display. Such a display does not necessitate tracking or re-rendering for one or more users to enjoy such an immersive display (though as with the previous embodiment, such features can add to the immersive nature of such a display).

Other Embodiments—FIG. 4

FIG. 4 provides an example of an array that may be steered, to directly face a tracked user. This is accomplished by placing the array on a rotary bearing, and driving said array in the bearing with a servo motor. Such an implementation allows the array to be focused into a smaller space, and thus improves the brightness.

Other Embodiments—FIG. 5

FIG. 5 offers an example of another type of two-dimensional scanner. In this case, a pair of lenses or (Geometric Phase Holographic Lenses) are displaced with respect to one another in two dimensions.

Other Embodiments—FIG. 6

FIG. 6 offers an example of how a one-dimensional scanner can be made to scan at varying trajectories by pivoting about the central axis of the stationary mirror, driven by a servo motor.

Figure 7A:
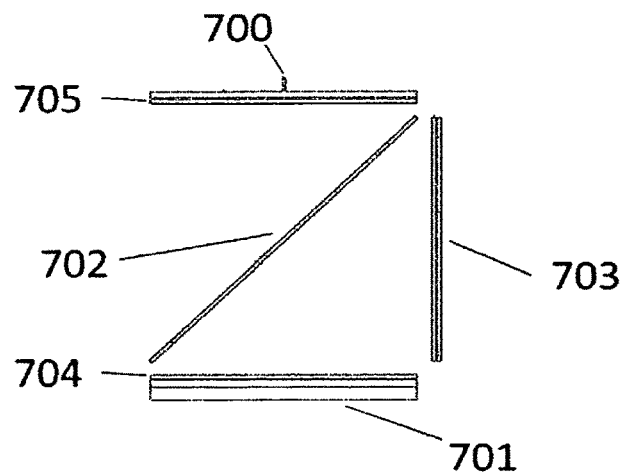
Figure 7B:
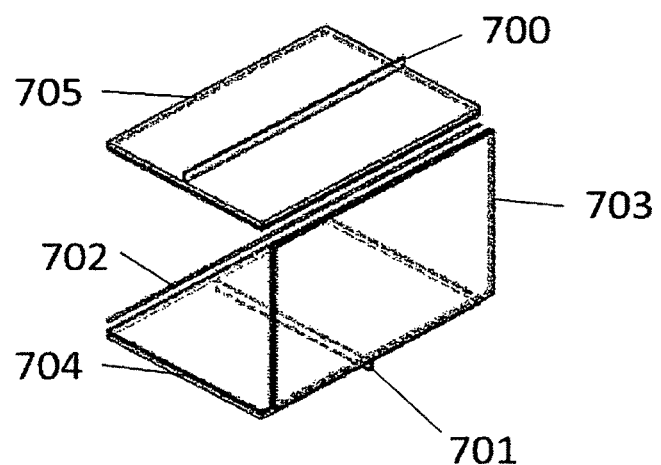

Other Embodiments—FIGS. 7A and 7B

FIG. 7A offers an example of using two one-dimensional scanners together as a two-dimensional scanner. FIG. 7A shows the following components in profile: Vertical scanning flexure (700), Horizontal scanning flexure (701), Reflective wire-grid polarizer (702), Quarter-wave plate and linear polarizer (703), Quarter-wave plate and horizontal scan mirror (704), Quarter-wave plate and vertical scan mirror (705).

FIG. 7B shows a perspective view of the scanner assembly from FIG. 7A and its component parts.

CONCLUSIONS, RAMIFICATIONS, AND SCOPE

Thus the reader will see that at least one embodiment of the display provides a more compelling, immersive, yet economical display device that can be useful for a great many applications.

While my above description contains many specificities, these should not be construed as limitations on the scope, but rather as an exemplification of several embodiments thereof. Many other variations are possible.

Accordingly, the scope should be determined not by the embodiments illustrated, but by the appended claims and their legal equivalents.

What is claimed is:

1. A display system for displaying a two-dimensional image comprising:
    display means including a plurality of light sources arranged to form an array of display elements with a predetermined spatial distribution, said display means including means for modulating each of said light sources for representing elements of the two-dimensional image;
    at least one scanning means worn or carried by a user for viewing said array, said at least one scanning means in electronic communication with said display means, and including a scanning device and driving means for driving said scanning device;
    said modulating means and said at least one scanning means cooperative via said electronic communication for synchronizing said modulating means and said scanner driving means such that the user views said one-dimensional array of display elements, via said at least one scanning means, as the two-dimensional image;

at least one tracking means to measure at least one of the relative angles of displacement of said at least one scanning means with respect to said display means; and wherein the scanning trajectory of said at least one scanning means, and/or the timing of said modulating means, is adjusted based on said at least one relative angle of displacement measured by said at least one tracking means, which allows the distance between said at least one scanning means and said display means to be variable while still permitting the user to view the two-dimensional image through said at least one scanning means.

2. The display system of claim 1 further providing a means of eliminating image distortion by adjusting said modulating means in response to said tracking means.

3. The display system of claim 1 further providing a means of adjusting the scanning trajectory of said scanner.

4. The display system of claim 3 wherein said adjusting means includes a servo motor and a one-dimensional scanning means.

5. The display system of claim 3 wherein said at least one scanning means is a two-dimensional scanning means.

6. The display system of claim 5 wherein said two-dimensional scanning means includes a Risley scanning device.

7. The display system of claim 5 wherein said two-dimensional scanning means includes multiple one-dimensional scanning means.

8. The display system of claim 5 wherein said two-dimensional scanning means includes a two-dimensional decentered lens scanning means.

9. The display system of claim 1 wherein said at least one scanning means includes one or more switchable polarization grating based devices.

10. The display system of claim 1 wherein said array is steerable.

11. The display system of claim 1 wherein said array includes a focusing means.

12. The display system of claim 1 wherein said array includes a means of altering the polarization of light from said light sources.

13. The display system of claim 1 wherein said at least one scanning means further includes at least one circular polarization filter.

14. A display system for displaying a two-dimensional image comprising:

display means including a plurality of light sources arranged to form a two-dimensional array of display elements, said display means including means for modulating each of said light sources for representing elements of the two-dimensional image;

at least one scanning means worn or carried by a user for viewing said two-dimensional array, said at least one scanning means in electronic communication with said display means, and including a scanning device and driving means for driving said scanning device;

said modulating means and said at least one scanning means cooperative via said electronic communication for synchronizing said modulating means and said scanner driving means such that the user views said one-dimensional array of display elements, via said at least one scanning means, as the two-dimensional image; and wherein said two-dimensional array partially or completely surrounds said user such that the scanning trajectory of said at least one scanning means aligns with at least a portion of said two-dimensional array at a plurality of relative angles of displacement of said at least one scanning means with respect to said display means, which allows the distance between said at least one scanning means and said display means to be variable while still permitting the user to view the two-dimensional image through said at least one scanning means.

15. The display system of claim 14 wherein said array includes a means of altering the polarization of light from said light sources.

16. The display system of claim 14 wherein said at least one scanning means further includes at least one circular polarization filter.

17. A display system for displaying a two-dimensional image comprising:

display means including a plurality of light sources arranged to form a plurality of physically separate display element arrays, said display means including means for modulating each of said light sources for representing elements of the two-dimensional image;

at least one scanning means worn or carried by a user for viewing said display element arrays, said at least one scanning means in electronic communication with said display means, and including a scanning device and driving means for driving said scanning device;

said modulating means and said at least one scanning means cooperative via said electronic communication for synchronizing said modulating means and said scanner driving means such that the user views said one-dimensional array of display elements, via said at least one scanning means, as the two-dimensional image; and wherein said plurality of arrays partially or completely surrounds said user such that the scanning trajectory of said at least one scanning means aligns with at least a portion of said plurality of arrays at a plurality of relative angles of displacement of said at least one scanning means with respect to said display means, which allows the distance between said at least one scanning means and said display means to be variable while still permitting the user to view the two-dimensional image through said at least one scanning means.

18. The display system of claim 17 wherein said plurality of arrays allow said two-dimensional image to occupy a greater physical space than a single array would allow.

19. The display system of claim 17 wherein said plurality of arrays allow said two-dimensional image to provide a higher resolution image than a single array would allow.

20. The display system of claim 17 wherein said plurality of arrays is used to provide additional depth cues or parallax.

21. The display system of claim 17 wherein said plurality of arrays is used to provide multiple image channels to said at least one scanning means.

22. The display system of claim 17 wherein said at least one scanning means further includes one circular polarizing filter.

* * * * *